US006865378B2

United States Patent
Wakabayashi

(10) Patent No.: US 6,865,378 B2
(45) Date of Patent: Mar. 8, 2005

(54) RADIO RECEPTION APPARATUS AND HIGH SPEED EQUALIZATION PROCESSING METHOD THEREFOR

(75) Inventor: Yasuhiko Wakabayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 09/984,708

(22) Filed: Oct. 31, 2001

(65) Prior Publication Data

US 2002/0055335 A1 May 9, 2002

(30) Foreign Application Priority Data

Nov. 6, 2000 (JP) .......................................... 2000-337208

(51) Int. Cl.⁷ .............................................. H04B 17/02
(52) U.S. Cl. ..................... 455/134; 455/277.1; 375/347
(58) Field of Search ................................ 455/132, 133, 455/134, 135, 272, 277.1, 277.2; 375/347, 316, 229, 232

(56) References Cited

U.S. PATENT DOCUMENTS 5,065,411 A * 11/1991 Muto .......................... 375/232
5,203,027 A * 4/1993 Nounin et al. ............... 455/134
5,291,519 A * 3/1994 Tsurumaru ................... 375/230

FOREIGN PATENT DOCUMENTS

JP          11-308158          11/1999

* cited by examiner

Primary Examiner—Lee Nguyen
Assistant Examiner—Minh D Dao
(74) Attorney, Agent, or Firm—Sughrue Mion, PLLC

(57) ABSTRACT

The invention provides a radio reception apparatus by which a delay by initialization of an equalizer is minimized and an equalization process with a minimum preamble signal can be performed normally to assure a high transmission efficiency and suppress an increase of the power consumption. First and second RF sections convert the frequencies of reception data from first and second antennae. A comparison section compares reception sensitivities of outputs of the first and second RF sections to select the output having a higher reception sensitivity.

9 Claims, 7 Drawing Sheets

RADIO RECEPTION APPARATUS AND HIGH SPEED EQUALIZATION PROCESSING METHOD THEREFOR

BACKGROUND OF THE INVENTION

1. Field of the Invention

The present invention relates to a reception apparatus for a radio communication system which utilizes a minimum preamble signal to assure a high efficiency in high speed transmission in a multi-path environment, and more particularly to a technique for high speed equalization processing and a technique for reduction of the power consumption.

2. Description of the Related Art

In data transmission of a high speed radio ATM (Asynchronous Transfer Mode) system which is one of multimedia mobile communication systems of 20 to 30 Mbps (megabits/second: unit of the transmission rate) and uses the 5.2 GHz band, in order to prevent quality deterioration of data by multi-path fading, an equalization function is used, and in order to allow high speed processing of an equalizer, a minimum preamble signal is used.

As an apparatus of the type described, for example, a radio data communication terminal of the narrow-band modulation type is disclosed in Japanese Patent Laid-Open No. 308158/1999 which can use a minimum preamble to determine a frequency offset value for operating a phase rotating element and then set a tap coefficient to be used by an equalizer. More particularly, the radio data communication terminal determines a frequency offset value for operating an automatic frequency control circuit within a preamble period of one frame period in accordance with a narrow-band modulation system wherein NRZ (Non-Return to Zero) codes of the opposite polarities of the GMSK (Gaussian filtered MSK (Minimum Shift Keying)) are passed through a low-pass filter of the Gaussian type and then inputted to a phase-continuous FSK (Frequency Shift Keying) modulator of a modulation index of 0.5 to modulate the codes, estimates the transmission line characteristic, determines a tap coefficient necessary for an equalizer, sets the tap coefficient to the equalizer and then performs equalization of a reception signal by means of the equalizer.

FIG. 4 shows an example of a configuration of an equation function of a conventional radio reception apparatus which uses a minimum preamble to determine a frequency offset value for operating a phase rotating element and then sets a tap coefficient to be used by an equalizer.

Referring to FIG. 4, the radio reception apparatus shown includes two first and second antennae 8a and 8b, a radio frequency (RF) section 9, a carrier detection section 10, an equalization processing section 11. The equalization processing section 11 includes a memory section 12, a phase rotating section 13, a phase difference detection section 14, an average value detection section 15, an integration circuit 16, a vector conversion circuit 17, a transmission line characteristic estimation section 18, a tap coefficient setting section 19, and an equalizer 20.

Transmission data from a base station are received by the two antennae 8a and 8b. The RF section 9 receives the reception data from the antennae 8a and 8b, performs a frequency conversion process and outputs the reception data of the converted frequency (quadrature demodulated I and Q signals) to the equalization processing section 11. The RF section 9 outputs a received signal strength indicator (RSSI) signal Q to the carrier detection section 10.

The carrier detection section 10 discriminates presence/absence of a carrier based on the RSSI signal Q from the RF section 9, and outputs, to the equalization processing section 11, a carrier sense signal S which exhibits an active state when a start of receive data is detected. Further, the carrier detection section 10 receives a demodulation data end signal R of a one-pulse signal representative of an end of demodulation data supplied thereto and outputs, to the equalization processing section 11, the carrier sense signal S serving as a control signal for stopping the outputting of demodulation data from the equalization processing section 11.

The memory section 12 fetches a reception data signal P (quadrature demodulation signal after conversion into a digital signal by an A/D conversion section not shown) for an arbitrary period of time and controls the outputting.

The phase rotating section 13 rotates the phase of the output signal of the memory section 12 by a necessary amount. The phase difference detection section 14 determines an angle at present and another angle after one period of a PN (Pseudo Noise) code string and determines a difference between the angles.

The average value detection section 15 integrates the value of the angle difference determined by the phase difference detection section 14 for a predetermined number of times and then divides the integrated value by the number of times to determine an average value (frequency offset value) of an average phase difference per one symbol. The integration circuit 16 integrates the frequency offset value determined by the average value detection section 15 in a unit of a symbol. The vector conversion circuit 17 converts a signal outputted from the integration circuit 16 into a real part amplitude value and an imaginary part amplitude value and outputs the real part amplitude value and the imaginary part amplitude value to the phase rotating section 13. The transmission line characteristic estimation section 18 uses the signal after the phase rotation by the phase rotating section 13 to determine a transmission line characteristic for one period of the PN code string within the preamble period. The tap coefficient setting section 19 determines a tap coefficient necessary for the equalizer 20 from the transmission line characteristic determined by the transmission line characteristic estimation section 18 and sets the tap coefficient to the equalizer 20. The equalizer 20 equalizes the output of the phase rotating section 13 by means of a filter having the tap coefficient set by the tap coefficient setting section 19 and outputs a demodulation data signal T to effect a reception process.

FIG. 5 illustrates an example of operation timings in an equalization function process of the radio reception apparatus shown in FIG. 4. Referring to FIG. 5, within an antenna changeover selection period δ of a preamble signal period γ positioned preceding to an information data period, the integration is performed on the antenna 8a side for a certain fixed period for each one frame, and then the antenna to be used is changed over to the antenna 8b. After the changeover, the integration is performed on the antenna 8b side for another certain fixed period. The integration output values integrated for the first antenna 8a side and the second antenna 8b side are compared with each other to select the antenna 8b side which exhibits a higher reception level. Then, the antenna to be used is fixed to the selected antenna, and burst reception (reception of information data) is performed using the selected antenna.

Within the preamble signal period γ, the carrier detection section 10 discriminates presence/absence of a carrier to detect a start of reception data, and then automatic gain control (AGC) and automatic frequency control (AFC) by an automatic frequency control circuit (not shown) for dealing with amplitude and phase variations in demodulation processing are performed. Further, the equalization processing section 11 performs detection of a frequency offset, estimation of a transmission line characteristic and setting of a tap coefficient.

FIG. 6 illustrates an example of reception timings of the conventional radio reception apparatus shown in FIG. 4 when an idle time is comparatively long. The reception data signal P successively received from the RF section 9 is composed of a preamble signal used for various kinds of training and information data. Within a preamble period placed before an information data period within one frame period, the same PN string is transmitted repetitively. The carrier detection section 10 discriminates presence/absence of a carrier based on the RSSI signal Q from the RF section 9 to detect a start of reception data, and after a start of reception data is detected, that is, after the carrier sense signal S outputted from the carrier detection section 10 changes into an active state, the equalization processing section 11 performs detection of a frequency offset, estimation of a transmission line characteristic and setting of a tap coefficient.

In the initialization of the equalizer 20, a preamble signal which includes repetitions of a PN code is stored into the memory section 12 and processed for a certain fixed time, and therefore, a delay appears as much. The demodulation data signal T is outputted after the initialization of the equalizer 20. As seen from FIG. 6, a delay corresponding to the initialization period of the equalizer 20 occurs at the equalization processing section 11, and the transmission efficiency is deteriorated because the idle period is long.

FIG. 7 illustrates an example of reception timings of the conventional radio reception apparatus shown in FIG. 4 when the idle period is short. The reception data signal P successively received from the RF section 9 is composed of a preamble signal used for various kinds of training and information data. After presence/absence of a carrier is discriminated based on the RSSI signal Q from the RF section 9 to detect a start of reception data, the equalization processing section 11 performs detection of a frequency offset, estimation of a transmission line characteristic and setting of a tap coefficient. In the initialization of the equalizer 20, a preamble signal which exhibits repetitions of a PN code is stored into the memory section 12 and processed for a certain fixed period of time. Therefore, a delay for approximately 200 symbols in the maximum occurs. The demodulation data signal T is outputted after the initialization of the equalizer 20 is performed.

If the idle period is shorter than the delay and a next frame is received within a carrier sense period $\epsilon$, then the carrier sense signal $\zeta$ at a rising edge cannot be detected due to a collision of the frames. Reception data for one frame within which the carrier sense signal $\zeta$ is not successfully detected at a rising edge cannot be received normally, and a miss of one frame occurs with the demodulation data signal.

The conventional reception apparatus shown in FIG. 4 cannot perform high speed reception since the preamble signal is longer by the antenna changeover selection period $\delta$ of the preamble signal period $\gamma$. On the other hand, where the idle period from the end of information data to the start of the preamble period of the next frame is short, reception data cannot be received normally.

In the conventional radio reception apparatus described with reference to FIGS. 4 to 6, integration output values integrated for the antenna 8a side and the antenna 8b side are compared with each other to select that one of the antennae which exhibit a higher reception level (reception sensitivity) within the antenna changeover selection period $\delta$ within the preamble signal period $\gamma$ within which various kinds of training are performed, and then AGC and AFC as well as initialization necessary for the equalizer are performed. Therefore, the preamble signal becomes longer by the antenna changeover selection period $\delta$, and this deteriorates the transmission efficiency. Then, where the idle period is comparatively long, the transmission efficiency is deteriorated. On the other hand, where the idle period is comparatively short, if the idle period is shorter than a delay time and a next frame is received within a processing period of demodulation data, then a carrier sense signal cannot be detected. Consequently, such a problem occurs that reception data are received but abnormally for every other frame.

SUMMARY OF THE INVENTION

It is an object of the present invention to provide a radio reception apparatus and a high speed equalization process therefor by which a delay caused by initialization of an equalizer is minimized.

It is another object of the present invention to provide a radio reception apparatus and a high speed equalization process therefor wherein an equalization process with a minimum preamble signal can be performed normally to assure a high transmission efficiency and suppress an increase of the power consumption.

In order to attain the object described above, according to an aspect of the present invention, there is provided a radio reception apparatus, comprising first and second antennae for receiving data from a transmission side, a first radio frequency (hereinafter referred to as RF) section for performing a frequency conversion process of the reception data from the first antenna, a second RF section for performing a frequency conversion process of the reception data from the second antenna, first and second carrier detection sections for discriminating presence/absence of a carrier based on received signal strength indicator (hereinafter referred to as RSSI) signals from the first and second RF sections, respectively, a comparison section for comparing reception levels of the RSSI signals from the first and second RF sections with each other to select that one of the RSSI signals which has a higher reception level and supplying a signal representative of the selected reception level to that one of the first and second carrier detection sections which corresponds to that one of the first and second RF sections from which the selected signal has been outputted, an equalization processing section including an equalizer, and control means for supplying, based on carrier sense signals outputted from the first and second carrier detection sections, the reception data signal outputted from that one of the first and second RF sections which has a higher reception sensitivity to the equalization processing section and controlling the equalization processing section to operate based on the reception data signal.

The control means may include first and second logic circuits provided corresponding to the first and second carrier detection sections, respectively, each for controlling so that a reception data signal outputted from a corresponding one of the first and second RF sections corresponding to the first and second carrier detection sections may pass therethrough and be outputted within a period within which the carrier sense signal outputted from a corresponding one of the first and second carrier detection sections is active, a third logic circuit for logically ORing the outputs of the first and second logic circuits and outputting a result of the logical ORing as a reception data signal to the equalization processing section, and a fourth logic circuit for logically ORing the carrier sense signals outputted from the first and second carrier detection sections and outputting a result of the logical ORing as a signal for controlling operation of the equalization processing section to the equalization processing section.

The comparison means may supply, to that one of the first and second carrier detection sections which corresponds to that one of the first and second RF sections which has a higher reception sensitivity, a signal indicative of the reception level from the RF section, but supply, to the other one of the first and second carrier detection sections which corresponds to the other RF section which has a lower reception sensitivity, a signal of a level for rendering inactive the carrier sense signal to be outputted from the carrier detection section.

The equalization processing section may perform detection of a frequency offset, estimation of a transmission line characteristic and setting of a tap coefficient based on the reception data signal from the third logic circuit and the signal from the fourth logic circuit, and, after necessary initialization for the equalizer, output a demodulation data signal to perform a reception process.

Each of the first and second carrier detection sections may receive a demodulation data end signal, which is inputted commonly to the first and second carrier detection sections, and render inactive the carrier sense signal to be outputted.

According to another aspect of the present invention, there is provided a radio reception apparatus, comprising first and second antennae for receiving data from a transmission side, a first RF section for performing a frequency conversion process of the reception data from the first antenna, a second RF section for performing a frequency conversion process of the reception data from the second antenna, a comparison section for comparing a reception sensitivity of an output signal of the first RF section and a reception sensitive of an output signal of the second RF section with each other to select that one of the output signals which has a higher reception sensitivity, first and second carrier detection sections for outputting an output signal of an active state when a start of reception data is detected based on an output signal of the comparison section but rendering the output signal inactive when a demodulation data end signal is received, a first OR circuit for logically ORing the output signal of the first carrier detection section and the output signal of the second carrier detection section and outputting a result of the logical ORing, a first AND circuit for receiving the output signal of the first RF section and the output signal of the first carrier detection section and outputting the output signal of the first RF section within a period within which the output signal of the first carrier detection section is active, a second AND circuit for receiving the output signal of the second RF section and the output signal of the second carrier detection section and outputting the output signal of the second RF section within a period within which the output signal of the second carrier detection section is active, a second OR circuit for logically ORing the output signal of the first AND circuit and the output signal of the second AND circuit and outputting a result of the logical ORing, and an equalization processing section for receiving the reception data signal outputted from the first OR circuit and performing an equalization process for the received reception data based on the output signal of the second OR circuit.

The radio reception apparatus are advantageous in that, since the two systems of the RF sections are provided in parallel, a delay caused by initialization of the equalizer can be reduced. The radio reception apparatus are advantageous also in that, since that one of the antennae which has a higher reception sensitivity is selected for each one frame and also equalization processing with a minimum preamble signal is processed normally, a high transmission efficiency can be achieved. Further, the radio reception apparatus are advantageous in that, since only output reception data of that one of the RF sections which has a higher reception sensitivity are selectively used, the power consumption can be reduced.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
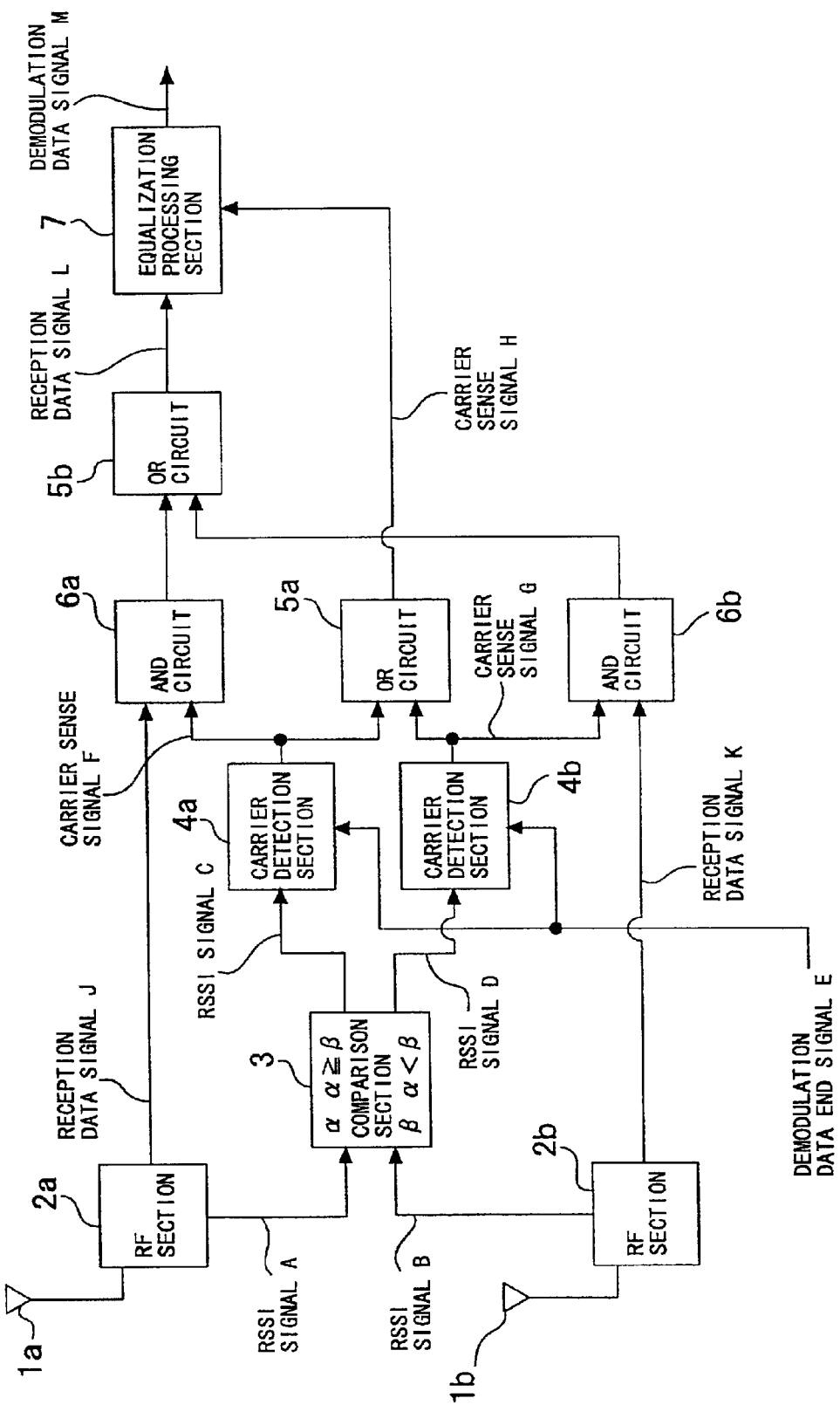
FIG. 1 is a block diagram showing a radio reception apparatus to which the present invention is applied.

Referring to FIG. 1, there is shown a radio reception apparatus to which the present invention is applied. The radio reception apparatus shown includes first and second antennae 1a and 1b for receiving data from the transmission side, first and second RF sections 2a and 2b for converting the frequency of reception data from the first and second antennae 1a and 1b, respectively, a comparison section 3 for comparing the magnitudes of the reception sensitivity α of an output signal of the first RF section 2a and the reception sensitivity β of an output signal of the second RF section 2b with each other to select that one of the output signals which has a higher reception sensitivity, first and second carrier detection sections 4a and 4b for detecting a start of reception data based on an output signal of the comparison section 3 and outputting an output signal of an active state and for receiving a demodulation data end signal and placing the output signal into an inactive state, a first OR circuit 5a for outputting a result of logical ORing of output signals of the first carrier detection section 4a and the second carrier detection section 4b, a first AND circuit 6a for receiving an output signal of the first RF section 2a and an output signal of the first carrier detection section 4a and outputting the output signal of the first antenna 1a within a period within which the output signal of the first carrier detection section 4a is in an active state, a second AND circuit 6b for receiving the output signal of the second RF section 2b and the output signal of the second carrier detection section 4b and outputting the output signal of the second RF section 2b within a period within which the output signal of the second carrier detection section 4b is in an active state, a second OR circuit 5b for outputting a result of logical ORing of output signals of the first AND circuit 6a and the second AND circuit 6b, and an equalization processing section 7 for receiving a reception data signal outputted from the second OR circuit 5b and equalizing the received reception data based on the output signal of the first OR circuit 5a.

The equalization processing section 7 receives a reception data signal L from the second OR circuit 5b, performs detection of a frequency offset, estimation of a transmission line characteristic and setting of a tap coefficient based on a carrier sense signal H from the first OR circuit 5a, and outputs, after the setting of the equalizer, a demodulation data signal M to perform a reception process.

Transmission data from a base station are received by the two first and second antennae 1a and 1b. The first RF section 2a performs frequency conversion processing of reception data from the first antenna 1a and outputs an RSSI signal A representative of a start of reception data to the comparison section 3. The second RF section 2b performs frequency conversion processing of reception data from the second antenna 1b and outputs an RSSI signal B representative a start of reception data to the comparison section 3.

The comparison section 3 compares the RSSI signal A from the first RF section 2a and the RSSI signal B from the second RF section 2b with each other to select that one of the two signals which has a higher reception level. More particularly, the comparison section 3 compares the reception sensitivity α of the RSSI signal A and the reception sensitivity β of the RSSI signal B with each other, and when the reception sensitivity α is equal to or higher than the reception sensitivity β, the comparison section 3 outputs an RSSI signal C (=RSSI signal A) to the first carrier detection section 4a and outputs an RSSI signal D of a low level signal to the second carrier detection section 4b. On the other hand, when the reception sensitivity α is lower than the reception sensitivity β, the comparison section 3 outputs the RSSI signal D (=RSSI signal B) to the second carrier detection section 4b and outputs the RSSI signal C of a low level signal to the first carrier detection section 4a.

The first carrier detection section 4a discriminates presence/absence of a carrier from the RSSI signal C from the comparison section 3. If the first carrier detection section 4a detects a start of reception data, then it outputs a carrier sense signal F of an active state (of the high level). Then, when a demodulation data end signal E of a one-pulse signal representative of an end of demodulation data is received, the first carrier detection section 4a places the carrier sense signal F into an inactive state and supplies it to the first OR circuit 5a and the first AND circuit 6a.

The second carrier detection section 4b discriminates presence/absence of a carrier from the RSSI signal D from the comparison section 3. If the second carrier detection section 4b detects a start of reception data, then it outputs a carrier sense signal G of an active state (of the high level). Then, when the demodulation data end signal E of a one-pulse signal representative of an end of demodulation data is received, the second carrier detection section 4b places the carrier sense signal G into an inactive state and supplies it to the first OR circuit 5a and the second AND circuit 6b.

The first OR circuit 5a logically ORs the carrier sense signal F from the first carrier detection section 4a and the carrier sense signal G from the second carrier detection section 4b and outputs a result of the logical ORing as a carrier sense signal H to the equalization processing section 7. In other words, the first OR circuit 5a selectively outputs one of the carrier sense signal G and the carrier sense signal H which has a higher reception sensitivity to the equalization processing section 7.

The first AND circuit 6a logically ANDs a reception data signal J from the first RF section 2a and the carrier sense signal F from the first carrier detection section 4a and outputs the reception data signal J to the second OR circuit 5b only within a period within which the carrier sense signal F is active.

The second AND circuit 6b logically ANDs a reception data signal K from the second RF section 2b and the carrier sense signal G from the second carrier detection section 4b and outputs the reception data signal K only within a period within which the carrier sense signal G is active.

The second OR circuit 5b logically ORs the outputs of the first AND circuit 6a and the second AND circuit 6b and outputs a result of the logical ORing as a reception data signal L to the equalization processing section 7. In other words, that one of the reception data signals which has a higher reception sensitivity is selectively supplied as a reception data signal L to the equalization processing section 7.

Figure 4:
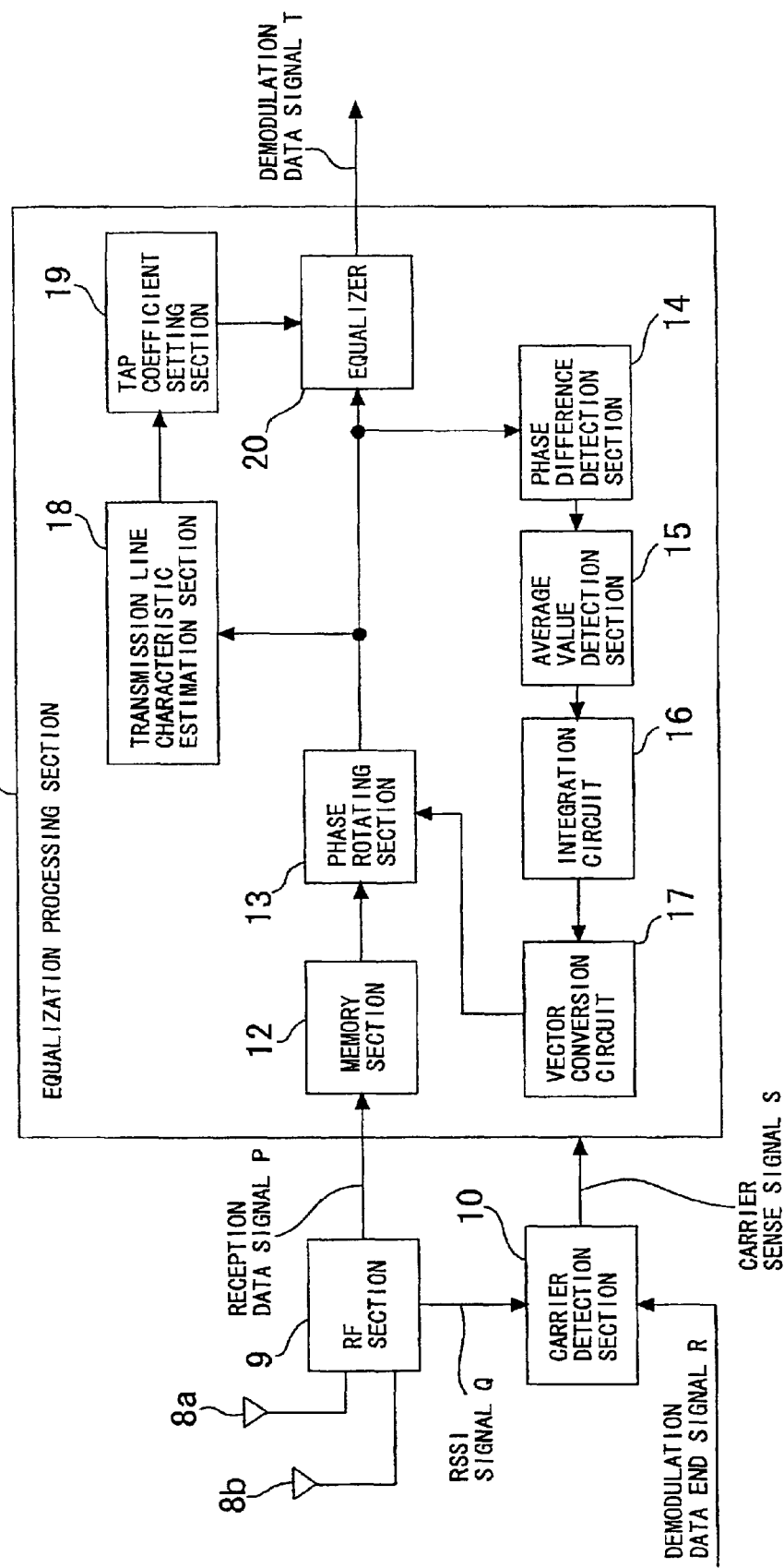
FIG. 4 is a block diagram showing an equalization processing section of a conventional radio reception apparatus.
Figure 5:
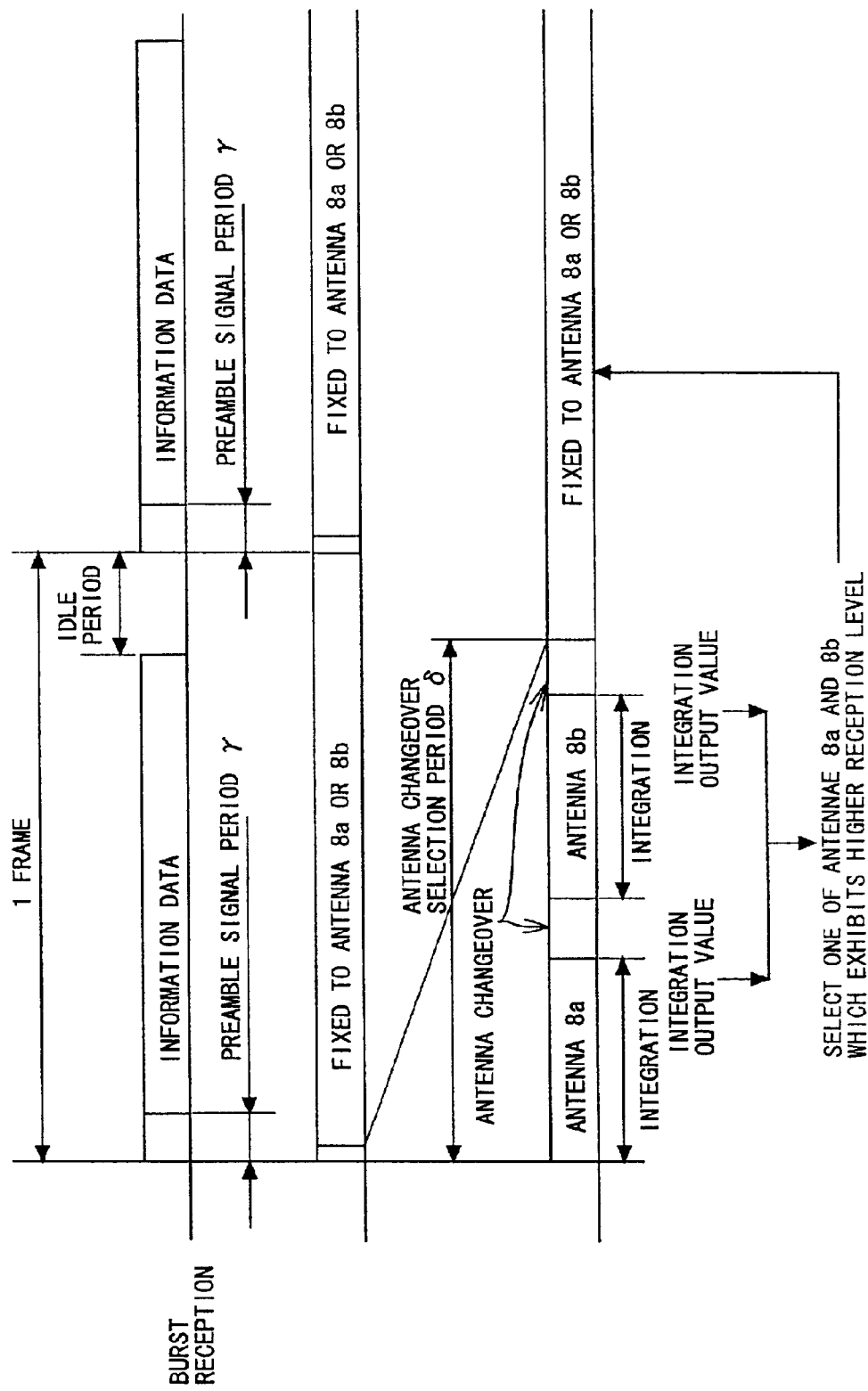
FIG. 5 is a diagrammatic view illustrating operation timings of the equalization processing section shown in FIG. 4.
Figure 6:
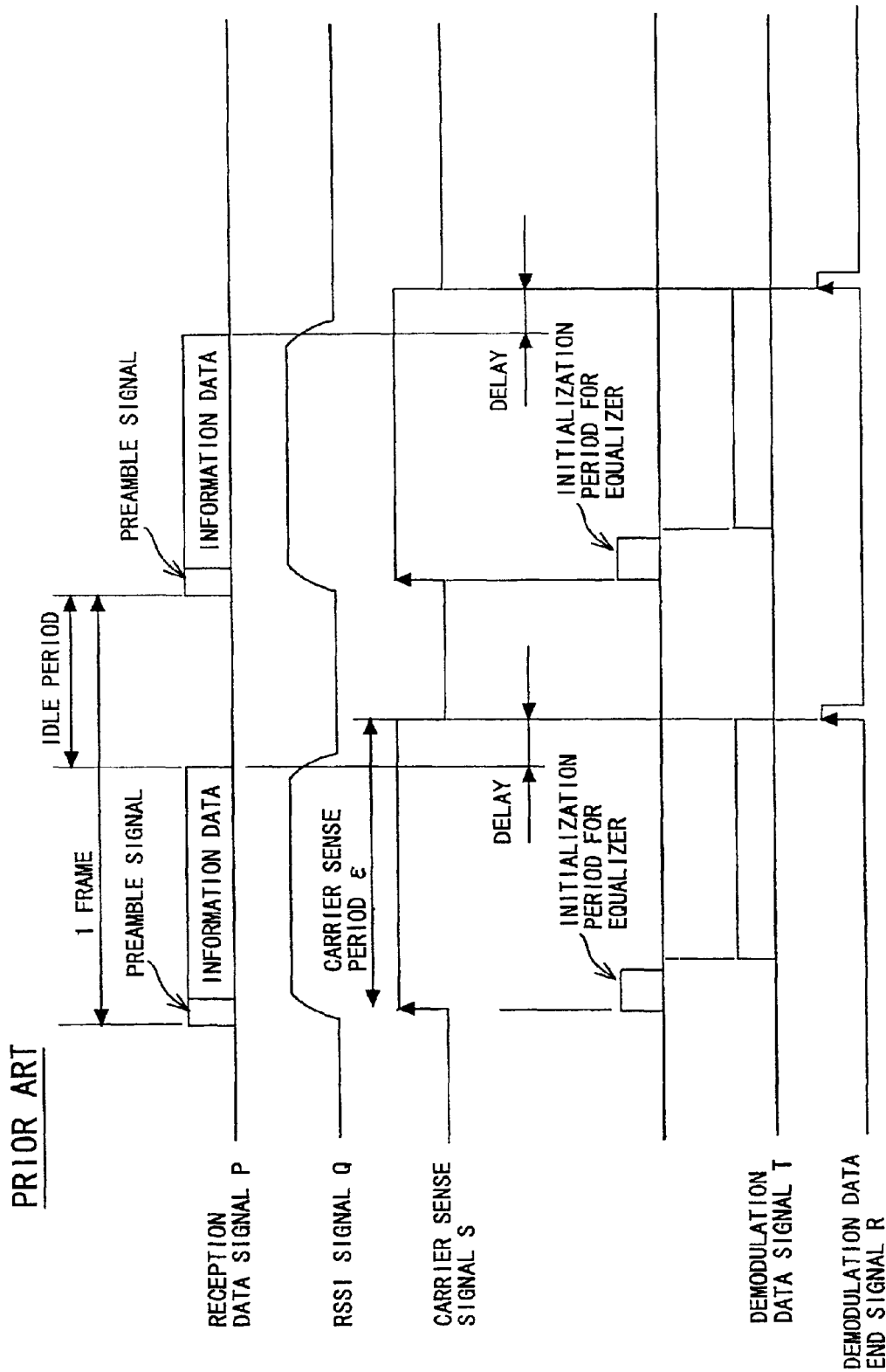
FIG. 6 is a waveform diagram illustrating operation timings of the conventional radio reception apparatus of FIG. 4 when the idle period is comparatively long.
Figure 7:
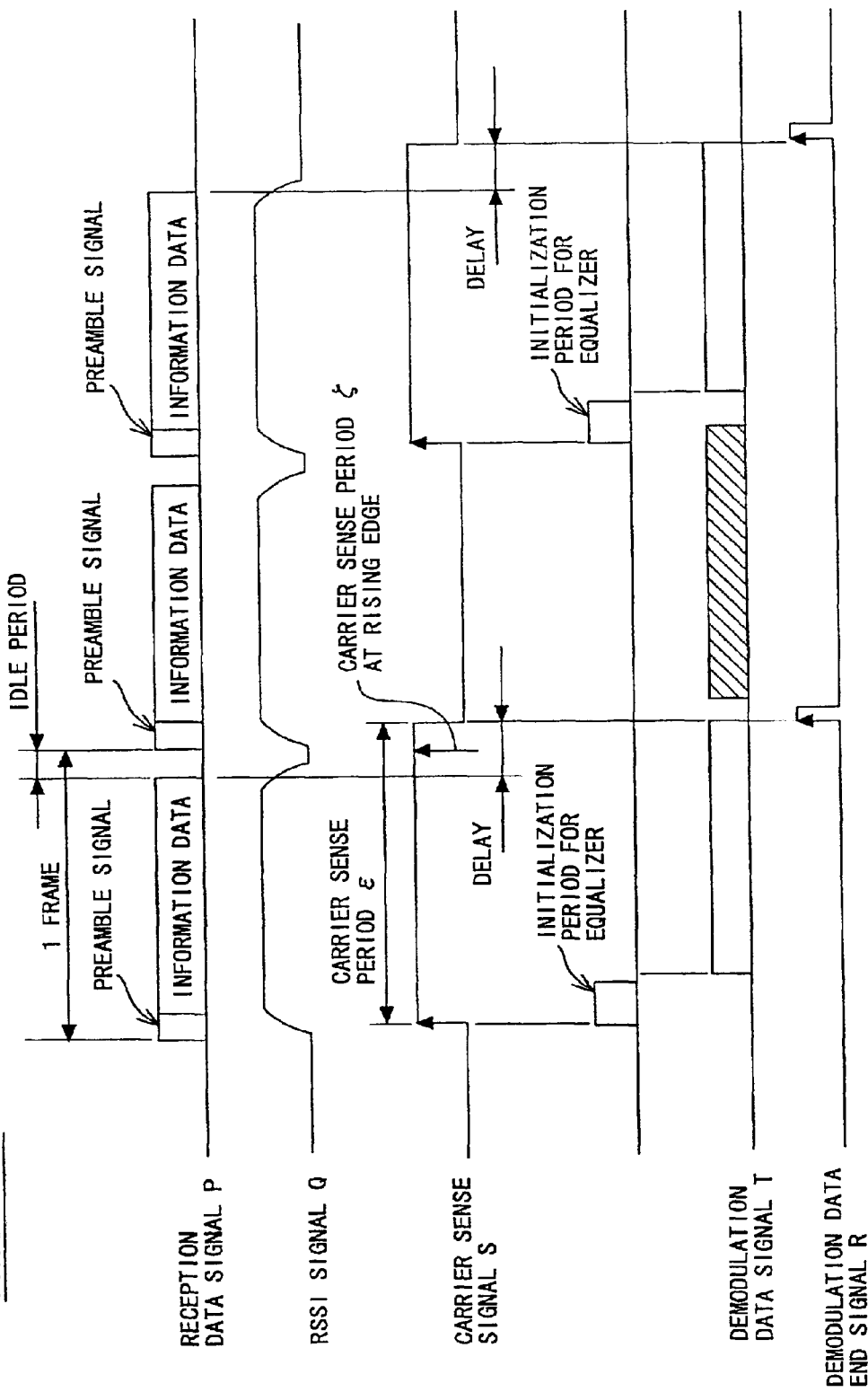
FIG. 7 is a waveform diagram illustrating operation timings of the conventional radio reception apparatus of FIG. 4 when the idle period is comparatively short.

The equalization processing section 7 performs detection of a frequency offset, estimation of a transmission line characteristic and setting of a tap coefficient based on the reception data signal L from the second OR circuit 5b and the carrier sense signal H from the first OR circuit 5a. After the initialization of the equalizer, the equalization processing section 7 outputs a demodulation data signal M to perform a reception process. In the radio reception apparatus of FIG. 1, the equalization processing section 7 may have, for example, a similar configuration to that described hereinabove with reference to FIG. 4 and include a memory section 12, a phase rotating section 13, a phase difference detection section 14, an average value detection section 15, an integration circuit 16, a vector conversion circuit 17, a transmission line characteristic estimation section 18, a tap coefficient setting section 19 and an equalizer 20 as seen in FIG. 4. Operation of the components is similar to that described in the description of the related art hereinabove, and therefore, overlapping description of the operation is omitted here to avoid redundancy.

Figure 2:
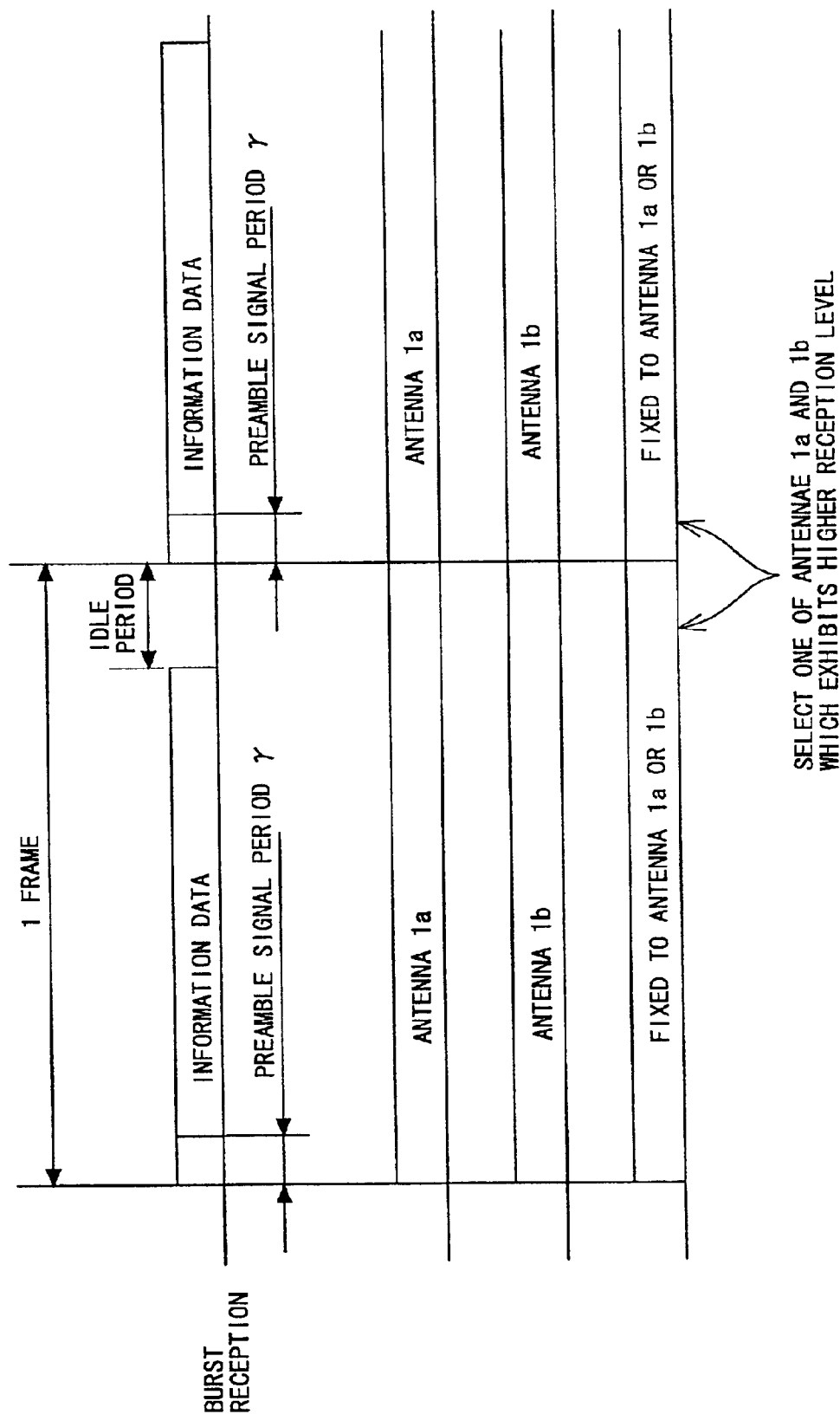
FIG. 2 is a diagrammatic view illustrating operation timings of the radio reception apparatus of FIG. 1.

FIG. 2 illustrates operation timings of the radio reception apparatus of FIG. 1. Referring to FIG. 2, in the radio reception apparatus of FIG. 1, the carrier sense signal F of the first antenna 1a side and the carrier sense signal G of the second antenna 1b side are normally outputted within a one-frame period.

For each one frame, that one of the first antenna 1a side and the second antenna 1b side which exhibits a higher reception level is selected, and while the antenna to be used is fixed to the selected antenna, burst reception is performed.

Within the preamble signal period γ, presence/absence of a carrier is discriminated. After a start of reception data is detected, automatic gain control (AGC) and automatic frequency control (AFC) for dealing with amplitude and phase variations in a demodulation process are performed. Further, detection of a frequency offset, estimation of a transmission line characteristic and setting of a tap coefficient (filter coefficient for a transversal filter which forms the equalizer) are performed.

Use of the two parallel RF sections allows further shortening of the preamble signal. In particular, when compared with a case wherein, within an antenna changeover selection period δ of the preamble signal period γ, integration is performed on the antenna 8a side for a certain fixed period for each one frame and the antenna to be used is changed over to the antenna 8b and then, after the changeover, the integration is performed on the antenna 8b side for another certain fixed period, whereafter the integration output values are compared with each other to select the antenna which exhibits a higher reception level and then the antenna to be used is fixed to the selected antenna and burst reception is performed using the selected antenna, in the radio reception apparatus, that one of the first antenna 1a and the second antenna 1b which outputs a higher one of reception levels outputted in parallel from them is selected. Consequently, the preamble period is reduced.

Figure 3:
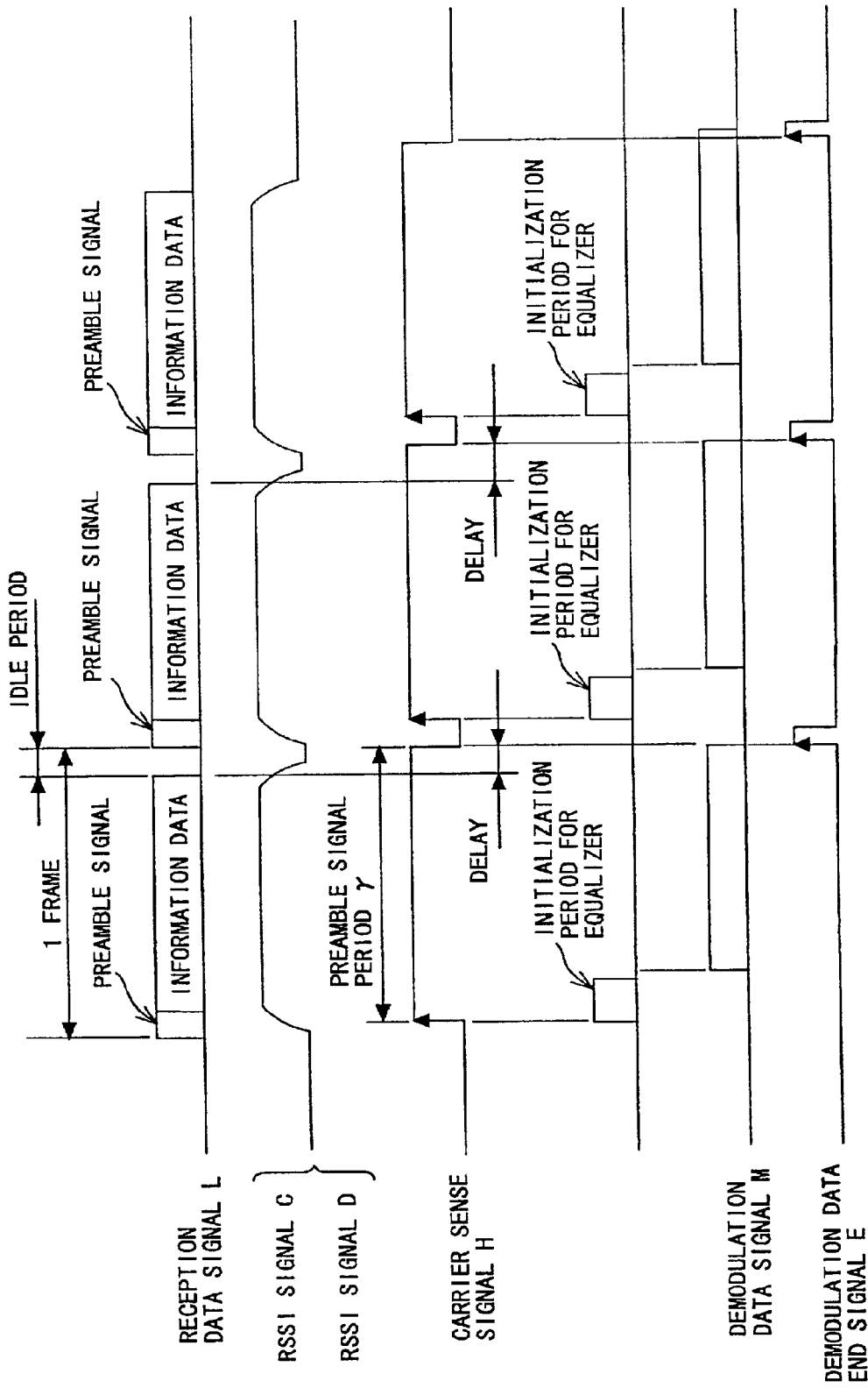
FIG. 3 is a waveform diagram illustrating reception timings of the radio reception apparatus of FIG. 1.

FIG. 3 illustrates reception timings of the radio reception apparatus of FIG. 1. Referring to FIG. 3, the reception data signal L successively received from the second OR circuit 5b includes a preamble signal to be used for various kinds of training and information data. The preamble signal includes repetitions of a PN code for a fixed period of time.

After the carrier sense signal H rises, detection of a frequency offset value, estimation of a transmission line characteristic and setting of a tap coefficient are performed with a signal of the PN code for one period.

Initialization of the equalizer suffers from a delay corresponding to 96 symbols in the maximum because the signal is processed after it is stored into the memory (memory section 12 of FIG. 4) provided in the equalization processing section 7. In other words, when compared with the conventional radio reception apparatus described hereinabove with reference to FIG. 4, the delay is reduced approximately to one half, and consequently, the carrier sense signal can be detected.

Simultaneously with an end of demodulation data, the first and second carrier detection sections 4a and 4b place the carrier sense signal F and carrier sense signal G to the low level, respectively, and consequently, the carrier sense signal H is placed into an inactive state (the low level).

The comparison section 3 selectively outputs that one of the RSSI signals which exhibits a higher reception sensitivity, but does not select the other RSSI signal having a lower reception sensitivity and changes it into a low level signal.

Due to the parallel circuit configuration of the first RF section 2a and the second RF section 2b, even if an equalization process is performed with a minimum preamble signal, a reception process can be performed normally. Further, since that one of the first antenna 1a and the second antenna 1b which has a higher reception sensitivity is selectively used, even if a delay is caused by initialization of the equalizer, a normal reception process can be achieved.

In the radio reception apparatus of FIG. 1, since output reception data of the RF section of one of the systems of the first RF section 2a and the second RF section 2b which has a higher reception sensitivity is selectively rendered operative (activated), the power consumption can be reduced.

While a preferred embodiment of the present invention has been described using specific terms, such description is for illustrative purposes only, and it is to be understood that changes and variations may be made without departing from the spirit or scope of the following claims.

What is claimed is:

1. A radio reception apparatus, comprising:
   first and second antennae for receiving data from a transmission side;
   a first RF section for performing a frequency conversion process of the reception data from said first antenna;
   a second RF section for performing a frequency conversion process of the reception data from said second antenna;
   first and second carrier detection sections for discriminating presence/absence of a carrier based on RSSI signals from said first and second RF sections, respectively;
   a comparison section for comparing reception levels of the RSSI signals from said first and second RF sections with each other to select that one of the RSSI signals which has a higher reception level and supplying a signal representative of the selected reception level to that one of said first and second carrier detection sections which corresponds to that one of said first and second RF sections from which the selected signal has been outputted;
   an equalization processing section including an equalizer; and
   control means for supplying, based on carrier sense signals outputted from said first and second carrier detection sections, the reception data signal outputted from that one of said first and second RF sections which has a higher reception sensitivity to said equalization processing section and controlling said equalization processing section to operate based on the reception data signal.

2. A radio reception apparatus as claimed in claim 1, wherein said control means includes:
   first and second logic circuits provided corresponding to said first and second carrier detection sections, respectively, each for controlling so that a reception data signal outputted from a corresponding one of said first and second RF sections corresponding to said first and second carrier detection sections may pass therethrough and be outputted within a period within which the carrier sense signal outputted from a corresponding one of said first and second carrier detection sections is active;
   a third logic circuit for logically ORing the outputs of said first and second logic circuits and outputting a result of the logical ORing as a reception data signal to said equalization processing section; and
   a fourth logic circuit for logically ORing the carrier sense signals outputted from said first and second carrier detection sections and outputting a result of the logical ORing as a signal for controlling operation of said equalization processing section to said equalization processing section.

3. A radio reception apparatus as claimed in claim 1, wherein said comparison means supplies, to that one of said first and second carrier detection sections which corresponds to that one of said first and second RF sections which has a higher reception sensitivity, a signal indicative of the reception level from the RF section, but supplies, to the other one of said first and second carrier detection sections which corresponds to the other RF section which has a lower reception sensitivity, a signal of a level for rendering inactive the carrier sense signal to be outputted from the carrier detection section.

4. A radio reception apparatus as claimed in claim 2, wherein said equalization processing section performs detection of a frequency offset, estimation of a transmission line characteristic and setting of a tap coefficient based on the reception data signal from said third logic circuit and the signal from said fourth logic circuit, and, after necessary initialization for said equalizer, outputs a demodulation data signal to perform a reception process.

5. A radio reception apparatus according to claim 1, wherein each of said first and second carrier detection sections receives a demodulation data end signal, which is inputted commonly to said first and second carrier detection sections, and renders inactive the carrier sense signal to be outputted.

6. A radio reception apparatus, comprising:

first and second antennae for receiving data from a transmission side;

a first RF section for performing a frequency conversion process of the reception data from said first antenna;

a second RF section for performing a frequency conversion process of the reception data from said second antenna;

a comparison section for comparing a reception sensitivity of an output signal of said first RF section and a reception sensitive of an output signal of said second RF section with each other to select that one of the output signals which has a higher reception sensitivity;

first and second carrier detection sections for outputting an output signal of an active state when a start of reception data is detected based on an output signal of said comparison section but rendering the output signal inactive when a demodulation data end signal is received;

a first OR circuit for logically ORing the output signal of said first carrier detection section and the output signal of said second carrier detection section and outputting a result of the logical ORing;

a first AND circuit for receiving the output signal of said first RF section and the output signal of said first carrier detection section and outputting the output signal of said first RF section within a period within which the output signal of said first carrier detection section is active;

a second AND circuit for receiving the output signal of said second RF section and the output signal of said second carrier detection section and outputting the output signal of said second RF section within a period within which the output signal of said second carrier detection section is active;

a second OR circuit for logically ORing the output signal of said first AND circuit and the output signal of said second AND circuit and outputting a result of the logical ORing; and an equalization processing section for receiving the reception data signal outputted from said second OR circuit and performing an equalization process for the received reception data based on the output signal of said first OR circuit.

7. A high speed equalization processing method for a radio reception apparatus which includes a pair of circuit systems connected in parallel and each including an antenna for receiving radio data and a RF section for performing a frequency conversion process of the data received by said antenna, and a pair of carrier detection sections provided corresponding to the RF sections of said circuit systems, comprising the steps of:

comparing RSSI signals from said RF sections with each other to select that one of the RSSI signals which has a high reception level and supplying a signal indicative of the selected reception level to that one of said carrier detection sections which corresponds to that one of said RF sections from which the selected signal has been outputted; and supplying, based on carrier sense signals outputted from said carrier detection sections, a reception data signal outputted from that one of said RF sections which has a higher reception sensitivity to an equalization processing section.

8. A high speed equalization processing method for a radio reception apparatus as claimed in claim 7, wherein the reception data outputted from that one of said RF sections which has the higher reception sensitivity are selectively supplied to said equalization processing section so that said equalization processing section operates based on the reception data supplied thereto.

9. A high speed equalization processing method for a radio reception apparatus as claimed in claim 7, wherein said equalization processing section performs detection of a frequency offset, estimation of a transmission line characteristic and setting of a tap coefficient, and, after necessary initialization for said equalizer, outputs a demodulation data signal to perform a reception process.

* * * * *

UNITED STATES PATENT AND TRADEMARK OFFICE
CERTIFICATE OF CORRECTION

PATENT NO. : 6,865,378 B2
DATED : March 8, 2005
INVENTOR(S) : Yasuhiko Wakabayashi It is certified that error appears in the above-identified patent and that said Letters Patent is hereby corrected as shown below:

Title page,
Item [57], ABSTRACT,
Line 6, delete "First and second RF sections convert the frequencies of reception data from first and second antennae. A comparison section compares reception sensitivities of outputs of the first and second RF sections to select the output having a higher reception sensitivity.".

Signed and Sealed this

Third Day of January, 2006

JON W. DUDAS
*Director of the United States Patent and Trademark Office*